United States Patent [19]

Fujita et al.

[11] Patent Number: 4,737,532
[45] Date of Patent: Apr. 12, 1988

[54] THERMOPLASTIC RESIN COMPOSITION CONTAINING WOOD FLOUR

[75] Inventors: Tamio Fujita, Akashi; Fumiya Nagoshi, Kobe, both of Japan

[73] Assignee: Kanegafuchi Kagaku Kogyo Kabushiki Kaisha, Osaka, Japan

[21] Appl. No.: 904,837

[22] Filed: Sep. 9, 1986

Related U.S. Application Data

[63] Continuation of Ser. No. 757,420, Jul. 22, 1985, abandoned.

[30] Foreign Application Priority Data

Jul. 23, 1984 [JP] Japan .................. 59-152387

[51] Int. Cl.$^4$ .............. C08L 55/02; C08L 27/06; C08L 97/02
[52] U.S. Cl. .................. 524/13; 524/504; 524/521
[58] Field of Search .................. 524/13, 504, 521

[56] References Cited

U.S. PATENT DOCUMENTS 4,379,190  4/1983  Schenck .................. 524/13

FOREIGN PATENT DOCUMENTS

| 0021049 | 2/1977 | Japan | 524/13 |
| 0067771 | 4/1983 | Japan | 524/13 |
| 0168645 | 10/1983 | Japan | 524/13 |
| 0204049 | 11/1983 | Japan | 524/13 |
| 0204050 | 11/1983 | Japan | 524/13 |
| 1434983 | 5/1976 | United Kingdom | 524/13 |

OTHER PUBLICATIONS

Derwent Abs. 83-749180/35 (J58027733) Idemitsu, Feb. 1983, (JA0027733).
Derwent Abs. 84-290829/47 (J59063546) Mitsui, Mar. 1984.

*Primary Examiner*—Herbert J. Lilling
*Attorney, Agent, or Firm*—Armstrong, Nikaido, Marmelstein & Kubovcik

[57] ABSTRACT

A thermoplastic resin composition comprising (A) 5 to 90 parts of a vinyl chloride polymer, (B) 90 to 50 parts of an ABS resin and (C) 70 to 5 parts of wood flour, the total amount of the component (A), (B) and (C) being 100 parts. The composition has functions and appearance peculiar to wood, excellent moldability and secondary processability and extremely improved heat distortion resistance.

12 Claims, No Drawings

THERMOPLASTIC RESIN COMPOSITION CONTAINING WOOD FLOUR

This application is a continuation of application Ser. No. 757,420 filed July 22, 1985, now abandoned.

BACKGROUND OF THE INVENTION

The present invention relates to a thermoplastic resin composition containing wood flour, and more particularly to a thermoplastic woody composition having functions and appearance peculiar to wood and excellent heat-resistance or heat distortion resistance.

In order to obtain composites having functions and appearance peculiar to wood and excellent molding processability of thermoplastic resins, there have been proposed various woody materials prepared by blending wood flour with a thermoplastic resin such as a vinyl chloride polymer or a polyolefin resin and, for instance, a blend of a vinyl chloride polymer and wood flour has been put to practical use. Such a blend of vinyl chloride polymer and wood flour has excellent flame-resistance, secondary processability and chemical resistance, but it is hard to obtain satisfactory moldings when a large amount of wood flour is incorporated. Moreover, the use of the moldings is limited, because the heat distortion resistance is poor.

On the other hand, a blend of a polyolefin resin and wood flour is poor in surface-hardness and rigidity and, moreover has the disadvantage of being hard to be adhered or coated.

An object of the present invention is to provide a thermoplastic resin composition containing wood flour which has functions and appearance peculiar to wood, excellent moldability and secondary processability, and moreover extremely improved heat distortion resistance.

A further object of the present invention is to provide a thermoplastic resin composition capable of blending a large amount of wood flour.

These and other objects of the present invention will become apparent from the description hereinafter.

SUMMARY OF THE INVENTION

In accordance with the invention, there is provided a thermoplastic resin composition comprising (A) 5 to 90 parts by weight of a vinyl chloride polymer, (B) 90 to 5 parts by weight of an ABS resin and (C) 70 to 5 parts by weight of wood flour, the total amount of the components (A), (B) and (C) being 100 parts by weight.

DETAILED DESCRIPTION

Preferably, the composition of the invention contains (A) 70 to 15 parts (part by weight, hereinafter the same) of the vinyl chloride polymer, (B) 70 to 10 parts of the ABS resin and (C) 60 to 15 parts of wood flour.

In case that the amount of the vinyl chloride polymer is less than 5 parts, chemical resistance of the composition is low. In case that the amount of the ABS resin is less than 5 parts, it is hard to obtain excellent moldings from the composition, when it contains a large amount of wood flour. In case that the amount of wood flour is less than 5 parts, it is hard to reveal the functions and appearance peculiar to wood, and in case that the amount of wood flour is more than 70 parts, it is hard to obtain moldings having excellent appearance and dimensional stability from the composition.

The moldings having excellent heat resistance and functions and appearance peculiar to wood can be obtained by mixing and kneading the components (A), (B) and (C) and molding the mixture. Usual molding methods such as extrusion, calendering, compression molding and injection molding are applicable to molding the composition of the invention. The thus obtained moldings have excellent adhesion, coating, property of lamination and secondary processability such as vaccum forming, pressure forming, cut off or cutting.

The vinyl chloride polymer employed in the invention is vinyl chloride homopolymer and a copolymer of not less than 75% (% by weight, hereinafter the same) of vinyl chloride and a monomer copolymerizable with vinyl chloride.

The term "ABS resin" as used herein means a resin composed of (B-1) 100 to 50% of a copolymer which is composed of (1) 25 to 80% of an aromatic vinyl compound, (2) 8 to 35% of an unsaturated nitrile compound, (3) 0 to 60% of a methacrylic acid ester or acrylic acid ester, and (4) 0 to 10% of other monomers copolymerizable with the aromatic vinyl compound, unsaturated nitrile compound, acrylic acid ester or methacrylic acid ester; and (B-2) 0 to 50% of a graft copolymer prepared by graft-polymerizing at least one of the above-mentioned monomers (1), (2), (3) and (4) onto polybutadiene or a butadiene copolymer of not less than 50% of butadiene and a monomer copolymerizable with butadiene.

Styrene or a substituted styrene, e.g. $\alpha$-methylstyrene, vinyl toluene, dimethylstyrene or chlorostyrene can be employed as the aromatic vinyl compound in the above-mentioned ABS resin. Acrylonitrile, methacrylonitrile, or the like can be employed as the unsaturated nitrile compound in the ABS resin. Alkyl methacrylic acid esters such as methyl methacrylate, ethyl methacrylate, butyl methacrylate and octyl methacrylate can be employed as the methacrylate in the ABS resin. Alkyl acrylic acid esters such as methyl acrylate, ethyl acrylate, butyl acrylate and octyl acrylate can be employed as the acrylate in the ABS resin. Representative examples of the other copolymerizable monomers are, for instance, vinyl chloride, vinyliden chloride, vinylacetate, maleic anhydride and maleimide. Particularly, it is preferable to employ the ABS resin containing $\alpha$-methylstyrene, more preferably ABS resin containing 20 to 55% of $\alpha$-methylstyrene, from the point of increasing heat distortion resistance of the composition.

The above-mentioned polybutadiene or butadiene copolymer used in the preparation of the graft copolymer (B-2) may be used in combination with or replaced with other elastomers, as occasion demands. Examples of such elastomers are, for instance, acrylonitrile-butadiene rubber (NBR), ethylene-propylene-diene terpolymer (EPDM), ethylene-vinylacetate copolymer (EVA), chlorinated polyethylene (CPE), acrylic rubber, polyurethane rubber, and the like. These elastomers themselves or graft copolymers prepared by graft-polymerizing at least one of the above-mentioned monomers (1), (2), (3) and (4) onto the elastomers may be employed as the component (B-2) so long as they are compatible with the vinyl chloride polymer (A) and the components (B-1) and (B-2) in the ABS resin (B).

With respect to wood flour employed in the invention, it is preferable that at least 80% of the particles has a particle size of 20 to 200 meshes. It is also preferable to use a thoroughly dried wood flour. Kinds of material wood are not limited.

When the composition of the invention is processed into molded articles, usual additives as used in molding of vinyl chloride polymers, and the like, for example, stabilizer, lubricant, antioxidant, ultraviolet absorber, pigment and processing aid can be employed. As occasion demands, filler, plasticizer and blowing agent can also be employed.

The present invention is more specifically described and explained by means of the following Examples. It is to be understood that the present invention is not limited to Examples, and various changes and modifications may be made in the invention without departing from the spirit and scope thereof.

EXAMPLES 1 to 4

A vinyl chloride polymer having an average degree of polymerization of 1000, an ABS resin composed of 60% of styrene, 20% of acrylonitrile and 20% of polybutadiene and wood flour having a particle size of not more than 32 meshes and a water content of about 8% were admixed in amounts shown in Table 1. To the mixture were added 4 parts of a lead stabilizer and 0.3 part of a hydrocarbone wax were added. After kneading the mixture by a mixing roll at a temperature of 200° to 205° C. for 5 minutes, it was pressed at 200° C. for 10 minutes to obtain sheets for use in measuring the physical properties.

The results are shown in Table 1.

The Izod impact strength was measured according to Japanese Industrial Standard (JIS) K 7110 (with notch), the vicat temperature was measured according to JIS K 7206 (load: 5 kg) and the modulus of elasticity in flexure was measured according to JIS K 7203.

EXAMPLE 5

A vinyl chloride polymer having an average degree of polymerization of 1000, an ABS resin composed of 40% of styrene, 20% of acrylonitrile, 20% of methyl methacrylate and 20% of polybutadiene and wood flour were admixed in amounts shown in Table 1. Sheets employed for the physical property tests were prepared in the same manner as in Examples 1 to 4.

The results are shown in Table 1.

EXAMPLES 6 and 7

A vinyl chloride polymer having an average degree of polymerization of 1000, an ABS resin composed of 38% of α-methylstyrene, 22% of acrylonitrile, 22% of styrene and 18% of polybutadiene and wood flour were admixed in amounts shown in Table 1. Sheets employed for the physical property tests were prepared in the same manner as in Examples 1 to 4.

COMPARATIVE EXAMPLES 1 to 3

A vinyl chloride polymer having an average degree of polymerization of 1000 and wood flour were admixed in amounts shown in Table 1. Sheets employed for the physical property tests were prepared in the same manner as in Examples 1 to 4.

The results are shown in Table 1.

As shown in Table 1, good roll-processed sheets were obtained in Examples 1 to 7. In Comparative Examples 1 to 3 (in which vinyl chloride polymer and wood flour were admixed), a good roll-processed sheet was obtained when the amount of wood flour was 20 parts, but good sheets were not obtained when the amount of wood flour was more than 20 parts.

From the above results, it would be understood that in case that a vinyl chloride polymer, an ABS resin and wood flour are admixed according to the present invention, not only a large amount of wood flour can be incorporated into thermoplastic resins, but also the vicat temperature and modulus of elasticity in flexure of the obtained sheets can be extremely increased as compared with the compositions containing the same amount of wood flour, but containing no ABS resin, as shown in Examples 1 to 5. Further, from Examples 6 and 7 wherein an ABS resin containing α-methylstyrene is used, it would be well understood that the vicat temperature of the obtained sheets is increased.

TABLE 1

| | Composition (part) | | | State of Sheet by roll-processing | Izod strength (kg · cm/cm) | Vicat temperature (°C.) | Modulus of elasticity in flexure (kg/cm$^2$) |
| --- | --- | --- | --- | --- | --- | --- | --- |
| | Vinyl chloride polymer | ABS resin | Wood flour | | | | |
| Ex. 1 | 60 | 20 | 20 | good | 3.3 | 91.0 | 48,500 |
| Ex. 2 | 40 | 20 | 40 | " | 2.5 | 102.0 | 67,000 |
| Ex. 3 | 20 | 20 | 60 | " | 2.0 | 113.0 | 86,000 |
| Ex. 4 | 40 | 40 | 20 | " | 3.5 | 92.0 | 45,000 |
| Ex. 5 | 40 | 20 | 40 | " | 2.5 | 103.0 | 68,000 |
| Ex. 6 | 40 | 40 | 20 | " | 3.5 | 103.0 | 46,000 |
| Ex. 7 | 20 | 40 | 40 | " | 2.2 | 115.0 | 65,000 |
| Com. Ex. 1 | 80 | 0 | 20 | " | 3.0 | 90 | 51,000 |
| Com. Ex. 2 | 60 | 0 | 40 | Sheet could not be prepared | — | — | — |
| Com. Ex. 3 | 40 | 0 | 60 | Sheet could not be prepared | — | — | — |

What we claim is:

1. A thermoplastic resin composition consisting essentially of (A) 5 to 90 parts by weight of a vinyl chloride polymer, (B) 90 to 5 parts by weight of an ABS resin and (C) 70 to 40 parts by weight of wood flour, the total amount of the components (A), (B) and (C) being 100 parts by weight.

2. The composition of claim 1, wherein the amount of said vinyl chloride polymer is 70 to 15 parts by weight and the amount of said ABS resin is 70 to 10 parts by weight.

3. The composition of claim 1, wherein said vinyl chloride polymer is vinyl chloride homopolymer.

4. The composition of claim 1, wherein said vinyl chloride polymer is a copolymer of not less than 75% by weight of vinyl chloride and a monomer copolymerizable with vinyl chloride.

5. The composition of claim 1, wherein said ABS resin comprises (B-1) 100 to 50% by weight of a copolymer comprising (1) 25 to 80% by weight of an aromatic vinyl compound, (2) 8 to 35% by weight of an unsaturated nitrile compound, (3) 0 to 60% by weight of a methacrylic acid ester or acrylic acid ester and (4) 0 to 10% by weight of other monomers copolymerizable with said aromatic vinyl compound, said unsaturated nitrile compound, said methacrylic acid ester or said acrylic acid ester; and (B-2) 0 to 50% by weight of graft copolymer prepared by graft-polymerizing at least one of said monomers (1), (2), (3) and (4) onto polybutadiene or a butadiene copolymer of not less than 50% by weight of butadiene and a monomer copolymerizable with butadiene.

6. The composition of claim 1, wherein said ABS resin contains α-methylstyrene.

7. The composition of claim 1, wherein said ABS resin contains 20 to 55% by weight of α-methylstyrene.

8. The composition of claim 5, wherein said polybutadiene or said butadiene copolymer used in the preparation of said (B-2) component is used in combination with other elastomers.

9. The composition of claim 5, wherein said polybutadiene or said butadiene copolymer used in the preparation of said (B-2) component is replaced with other elastomers.

10. The composition of claim 8, wherein said elastomer is a member selected from the group consisting of acrylonitrile-butadiene rubber, ethylene-propylenediene terpolymer, ethylene-vinylacetate copolymer, chlorinated polyethylene and acrylic rubber.

11. The composition of claim 9, wherein said elastomer is a member selected from the group consisting of acrylonitrile-butadiene rubber, ethylene-propylenediene terpolymer, ethylene-vinylacetate copolymer, chlorinated polyethylene and acrylic rubber.

12. The thermoplastic resin composition of claim 1, wherein said wood flour has at least 80% by weight of particles having a particle size of 20 to 200 meshes.

* * * * *